Nov. 7, 1961  G. W. TEBBS  3,007,439
SHEET FEED MECHANISM
Filed Feb. 27, 1959  14 Sheets-Sheet 2

Fig. 2.

INVENTOR
George W. Tebbs
BY
Ralph B. Stewart
ATTORNEY

Nov. 7, 1961 G. W. TEBBS 3,007,439
SHEET FEED MECHANISM
Filed Feb. 27, 1959 14 Sheets—Sheet 5

INVENTOR
George W. Tebbs
BY
Ralph B. Stewart
ATTORNEY

Nov. 7, 1961 G. W. TEBBS 3,007,439
SHEET FEED MECHANISM
Filed Feb. 27, 1959 14 Sheets-Sheet 6

INVENTOR
George W. Tebbs
BY
Ralph B. Stewart
ATTORNEY

Nov. 7, 1961 G. W. TEBBS 3,007,439
SHEET FEED MECHANISM
Filed Feb. 27, 1959 14 Sheets-Sheet 8

INVENTOR
George W. Tebbs
BY
Ralph B. Stewart
ATTORNEY

Nov. 7, 1961  G. W. TEBBS  3,007,439
SHEET FEED MECHANISM
Filed Feb. 27, 1959  14 Sheets-Sheet 11

INVENTOR
George W. Tebbs
BY
Ralph B. Stewart
ATTORNEY

United States Patent Office 3,007,439
Patented Nov. 7, 1961

3,007,439
SHEET FEED MECHANISM
George William Tebbs, Woodford Green, England, assignor to McCorquodale Colour Display Limited, London, England
Filed Feb. 27, 1959, Ser. No. 796,088
6 Claims. (Cl. 118—411)

The present invention relates to an improved feed mechanism for feeding paper and like sheets singly in intermittent succession from a supply source to a station at which the sheets are to be processed or operated upon.

It is a primary object of the invention to provide a feed mechanism with which successive sheets fed thereby are located in accurate similar register with respect to the processing or operating station.

The improved feed mechanism according to the invention is of particular utility in the feeding of a succession of single sheets into a position between two relatively movable surfaces between which the sheet is required to be pressed during processing or operation upon the sheet, and as an example may be mentioned feeding a succession of the sheets to a colour card producing machine such as is described in co-pending patent application Serial No. 690,825.

Such colour cards are usually formed with a large number of closely spaced patches of different colour each patch identified by an inscription pre-printed on the starting sheet or card and it is essential that the patches shall be deposited in accurate location on the sheet and particularly with regard to the related inscriptions and the feed mechanism forming the subject of the present invention enables a succession of single sheets to be produced rapidly with the required accurate location of the deposited patches.

In accordance with the present invention there is provided feed mechanism for feeding paper or like sheets singly in intermittent succession from a source of sheets to a processing or operating station, said mechanism comprising a lay table, a pair of parallel and intermittently and synchronously movable conveyors, bars supporting sheet grippers and extending between and connected with the said conveyors and capable of limited movement relative to said conveyors and movable by the conveyors between intervals of rest of the conveyors, from the lay table to the processing or operating station, means capable of imparting a movement, secondary to the feed movement by the conveyors, to a bar and the sheet grippers carried thereby while in the region of the lay table and to temporarily maintain the said bar and sheet grippers in a predetermined exact position in relation to the lay table as a preliminary to the engagement of the sheet on the lay table by the sheet grippers of said bar and feed of the said sheet by said conveyors to the processing or operating station and means capable of imparting movement, secondary to the feed movement by the conveyor, to the bar, the sheet grippers thereon and the gripped sheet while in the region of the processing or operating station and to temporarily maintain the said bar in a pre-determined exact position in relation to the said station.

One embodiment of the invention is illustrated by way of example in the accompanying drawings as applied to a machine for the production of colour cards.

Figure 11:
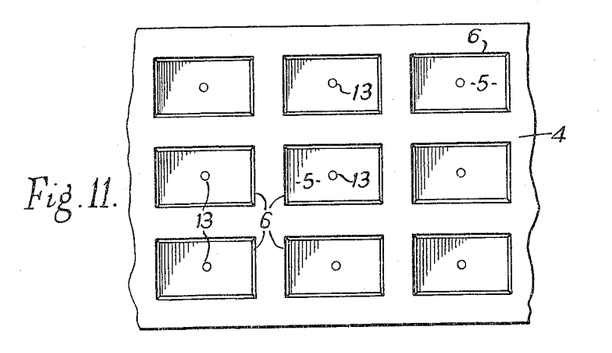
FIG. 11 is a view of a part of the operative surface of a matrix as used in the machine.

Referring to the drawings the machine comprises a frame structure 1 including four vertical posts 2 supporting a fixed head 3 beneath which is suspended in fixed position a matrix 4 of known form having a number of shallow cavities 5 as shown in FIG. 11 in its horizontal underside and of any desired shape bounded by edge ridges 6.

The posts 2 also serve as guides for a platen 7 movable vertically up and down e.g. by means of an hydraulic ram 8, the arrangement being such that a sheet of paper or card placed on the platen 7 may be raised into pressure engagement with the ridges 6 to close the cavities 5 in the matrix.

Above the head 3 are mounted groups of pumps 9 suitable for transferring liquid from reservoirs 10 through conduits 11 and 12 and through passages 13 (FIG. 11) through the matrix 4 to fill the cavities 5 when sealed by the paper or card sheet on the platen so that patches of liquid of precise shape and thickness are deposited on the paper or card sheet in preparation for lowering of the platen 7 and removal of the sheet from the machine.

The movements of the platen 7 and the operation of the pumps 9 take place in timed sequence under the influence of control cams on a continuously driven cam shaft 14, all in the manner described in copending application Ser. No. 690,825.

The present invention is concerned with a mechanism for the automatic conveyance of sheets in single succession to and from the operative position between the platen 7 and the matrix 4 with extreme accuracy of repetitive location of the sheets relative to the matrix 4.

The frame structure 1 includes extensions 15 and 16 at the entry and exit sides of the space between the platen 7 and matrix 4 and a pair of similar endless chains 17 and 18 are mounted one at the front and one at the back of the machine on sprockets 19 so disposed that the upper runs of the chains are on opposite sides of the platen 7 and the matrix 4.

Figure 1:
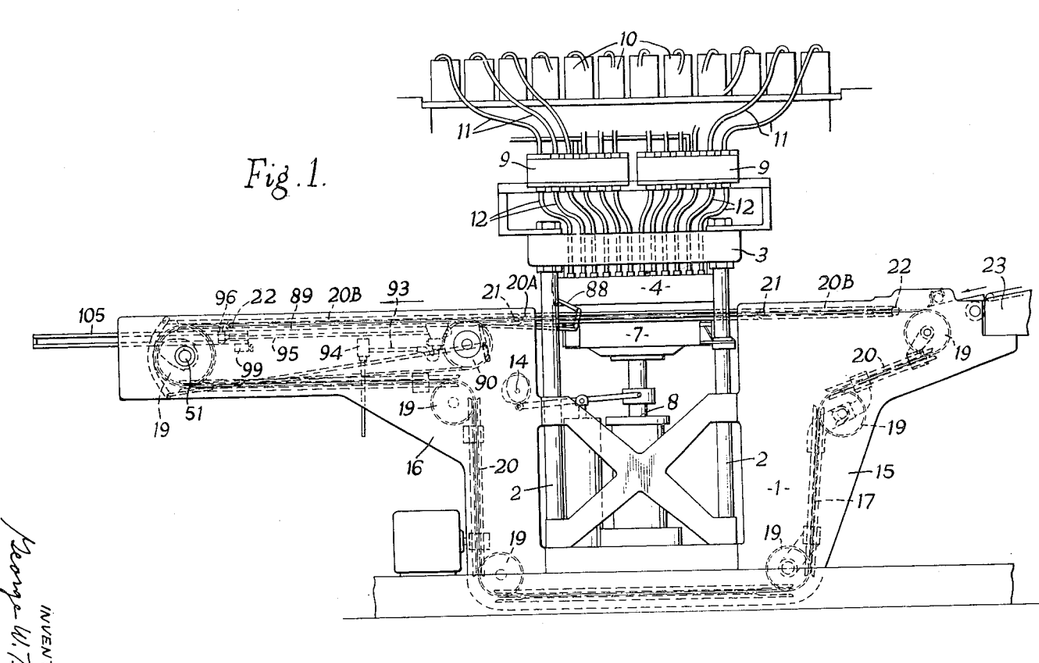
FIG. 1 is a view in side elevation of a complete machine.

The chains 17 and 18 move in guides 20 and short sections of guides 20A adjacent the platen 7 are fixed to the platen for rising and falling movements therewith, being pivotally connected at each end as shown at 21 in FIG. 1, to adjacent sections 20B themselves pivoted in the frame as shown at 22.

At the extremity of the extension 15 at the entry end of the machine is mounted a fixed lay board 23 downwardly inclined in the feed direction and provided with a side fence 24 and downwardly depending stop fingers 25 for the accurate location of a sheet on the lay board, the fingers 25 being arranged for rocking movement with a cross shaft 26 at appropriate times to raise the fingers to permit emergence of a sheet from the lay board 23.

The leading edge of the lay board 23 is provided with a number of uniformly spaced slots 27 of a length to extend to the rear of the lay board stop fingers 25.

Between the chains 17, 18 extend a number of uniformly spaced gripper bars 28 formed of circular section rods 29 surrounded by sleeves 30 and on these bars are mounted pairs of gripper fingers 31, extending generally radially of the bars and spaced along the bars at intervals corresponding to the spacing of the slots 27 in the edge of the lay board 23.

Figure 6:
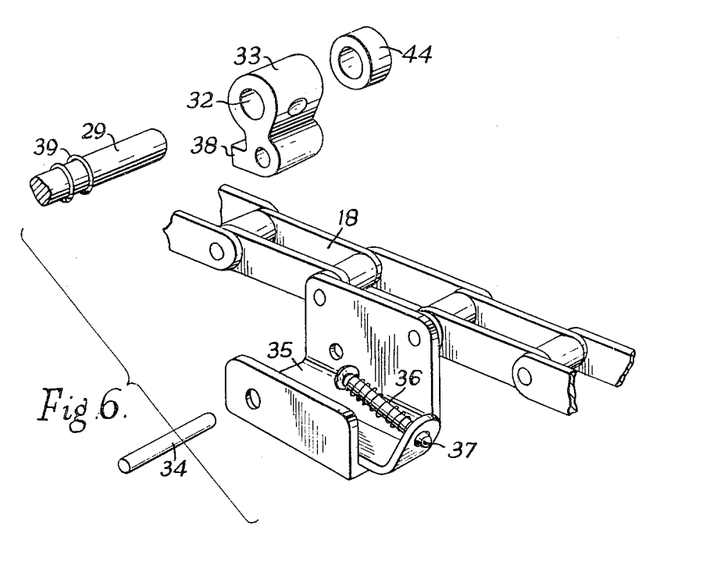

The gripper bars 28 are connected with the chains 17, 18 by the engagement of the ends of the rods 29 in holes 32 in blocks 33 (FIGS. 4 and 6) themselves mounted for limited rocking movement about axis pins 34 extending between the walls of channel-section brackets hereinafter termed gripper carriages 35 secured to the inner sides of the chains 17 and 18.

Compression springs 36 acting through sliding plungers 37 engage the blocks 33 in such manner as to urge the blocks 33 and therefore the gripper bars counterclockwise about the axis pins 34 to an extent determined by the engagement of parts 38 of the blocks 33 with the bottom of the gripper carriages 35.

The sleeves 30 of the gripper bars are pinned to the rods 29 and torsion springs 39 (FIG. 4) at one end of the rods 29 tend to rotate the gripper bars relative to the blocks 33 into a position in which the gripper fingers 31 extend substantially horizontally.

Figure 4:
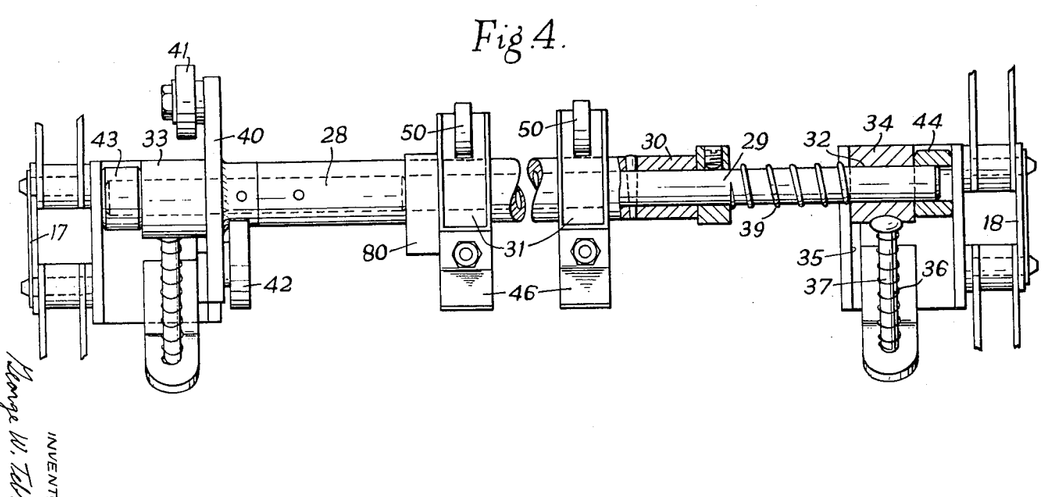
FIG. 4 is a view in plan of a gripper bar and parts carried thereby.
Figure 9:
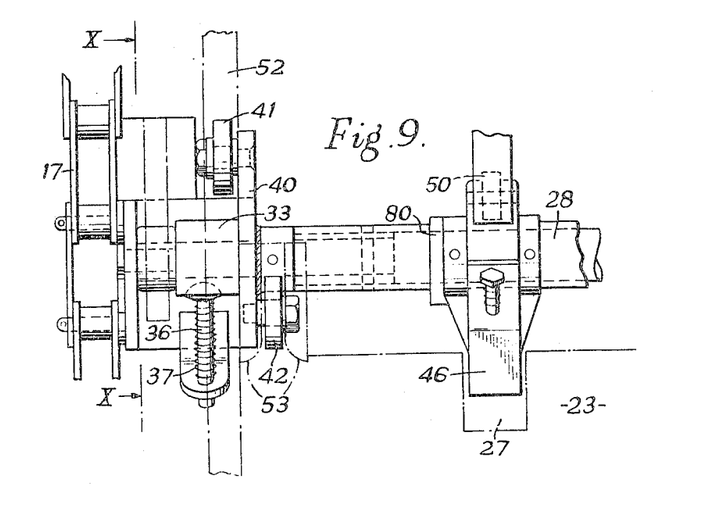
FIG. 9 is a view in plan and on a larger scale showing the means for locating a gripper bar in the position before receiving a sheet to be conveyed.
Figure 10:
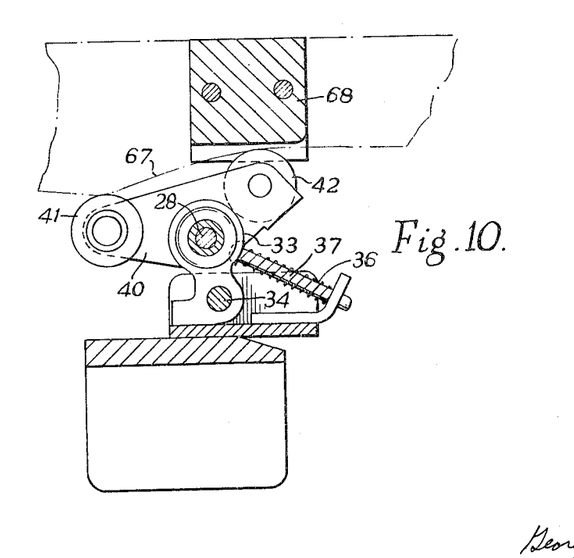
FIG. 10 is a view taken on the line X—X of FIG. 9.

To the sleeve 30 at the end adjacent one of the blocks 34, the left hand end in FIGS. 4, 9 and 10, is affixed a plate 40 having a pair of diametrically opposed rollers 41 and 42 on opposite sides thereof.

On the two extremities of the rod 29 between the side walls of the gripper carriages 35 are mounted free rolling sleeves 43 and 44.

Figure 5:
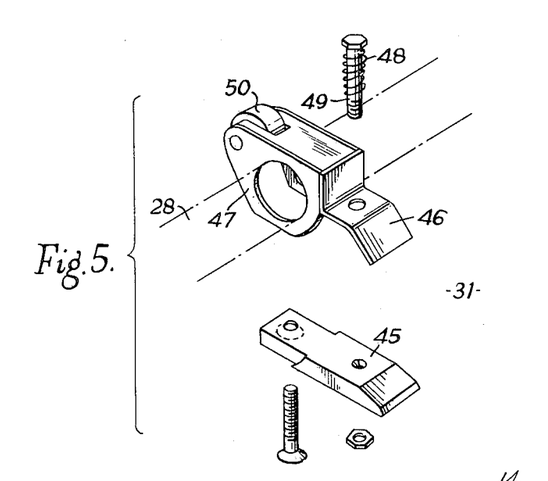
FIGS. 5 and 6 are perspective views showing details of the grippers carried by the gripper bars and the manner of connection of the gripper bars to the conveyors.

The pairs of gripper fingers 31 each comprise one lower finger 45 rigidly fixed to the gripper bar 28 and an upper finger 46 integral with bored side ears 47 (FIG. 5) engaged over and rockable on the sleeve 30 of the gripper bar and embracing the fixed end of the lower finger 45, the upper finger 46 being urged about the sleeve and towards the lower finger 45 by a compression spring 48 on a pin 49 extending through a hole in the upper finger and screwed into the lower finger. In the tail end of the upper finger 46 is mounted a roller 50.

The chains 17 and 18 are driven in a succession of equal steps from a drive shaft 51 in the direction of the arrows in FIG. 1, the chains being brought to rest with one gripper bar 28 adjacent the slotted edge of the lay board, another at a point adjacent the outlet side of the platen 7 and another at a take-off point whence the sheets with the deposits thereon are removed from the machine, other gripper bars of course being distributed along the lower run of the chains.

Figure 7:
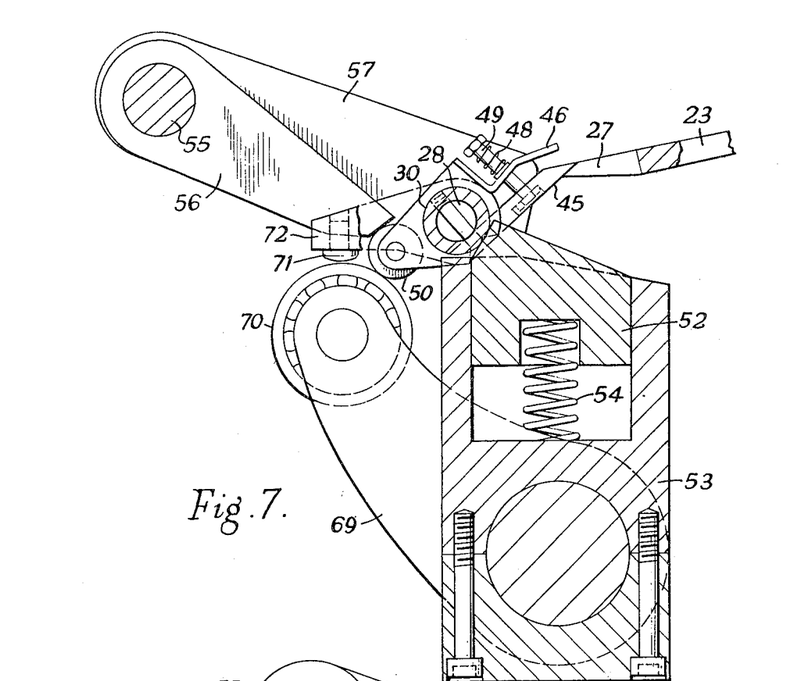
FIG. 7 is a view in end section and on a larger scale taken on the line VII—VII of FIG. 2

In the region of the slotted edge of the lay board 23 and opposite the approximate centre of the gripper bars 28 are mounted a pair of vertically movable plungers 52 (FIG. 2) these plungers being guided in fixed hollow posts 53 (FIG. 7) and being biased upwards by springs 54. The upper ends of the plungers 52 are of wedge formation as shown in FIG. 7 with one side steeper than the other, the arrangement being such that a gripper bar 28 can depress and ride over the summits of the plungers 52 by engagement with the sides of smaller inclination as the chains are moved to feed a sheet, the plungers thereafter returning under the urge of the springs 54 to a position in which the steeper sides of the wedge ends of the plungers 52 form non-return abutment stops for engagement by the gripper bar 28, whilst the gripper bar is supported from below by the upper end of the hollow guide posts 53.

At a point on the machine frame in advance of the slotted edge of the lay board 23 (FIG. 2) is mounted a rockable cross-shaft 55 in fixed bearings said cross-shaft having a number of radially extending arms 56 fixed thereon for engagement with the rollers 50 on the tails of the upper gripper fingers 46. At each end of the cross-shaft 55 is mounted a hook-ended lever 57, rockable about the shaft 55, the hooks being formed by slots 58 which can make fitting engagement over the roller sleeves 43 and 44 on the ends of the gripper bars 28, one face of the slots being struck at a radius about the axis of the cross-shaft 55.

Figure 3:
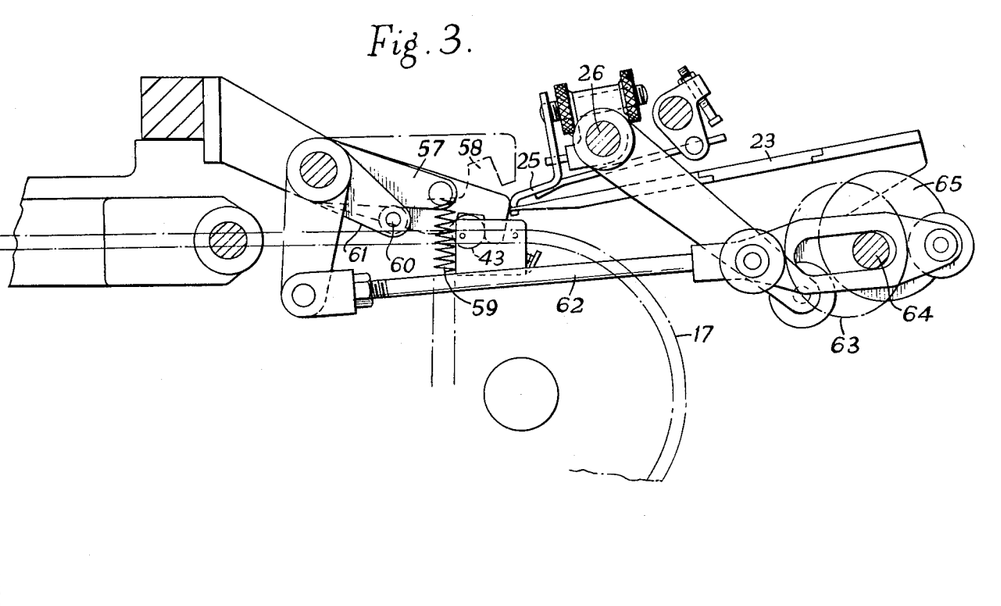
FIG. 3 is an enlarged sectional end view taken on the line III—III of FIG. 2.

The hook-ended levers 57 are biased downwards by springs 59 towards engagement with pins 60 on a bell crank lever 61 rockable in timed relation with movement of the chains by a link 62 controlled by a cam 63 on a cam shaft 64 (FIG. 3).

The same cam shaft 64 is fitted with a cam 65 functioning in conjunction with a lever 66 to raise and lower the stop fingers 25 at the lay board 23.

Figure 2:
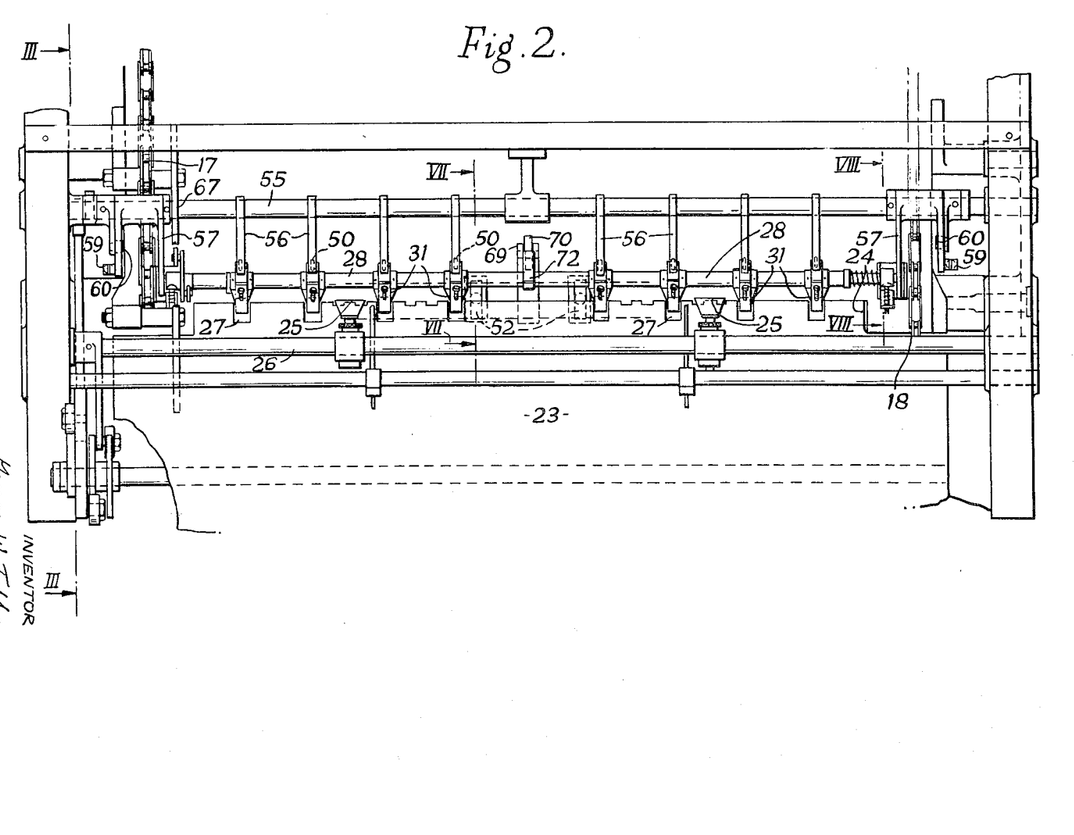
FIG. 2 is a plan view on a larger scale showing a gripper bar in position near a lay board in readiness to receive a sheet for conveyance.
Figure 8:
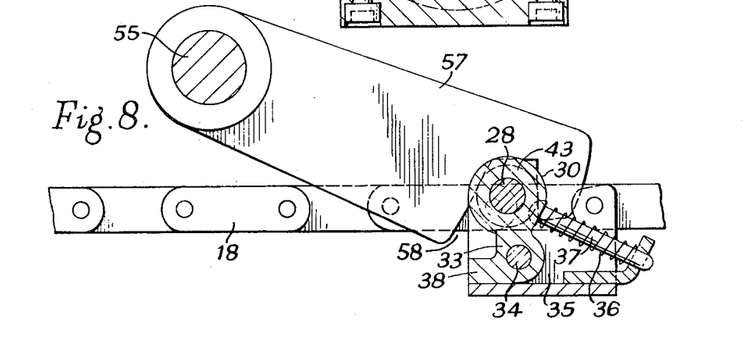
FIG. 8 is a view in end section also on a larger scale taken on the line VIII—VIII of FIG. 2.
Figure 12:
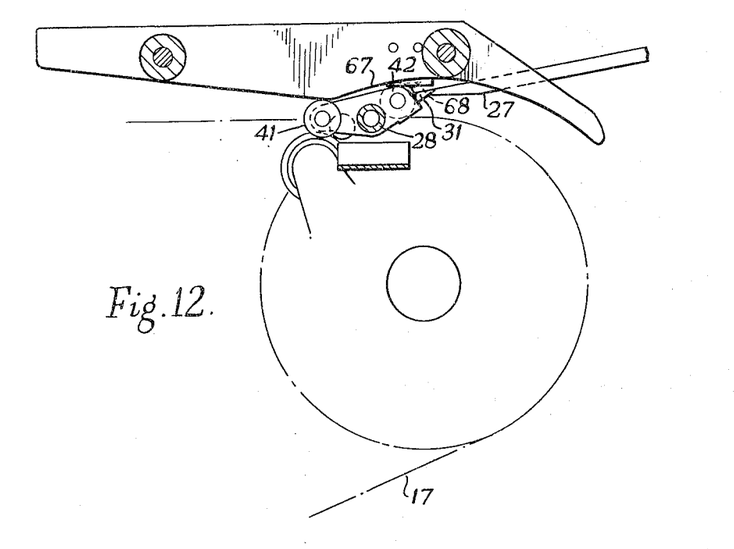
FIG. 12 shows a detail of the arrangement for locating the gripper fingers adjacent the lay board.

At a point near the slotted edge of the lay board 23 and at one side of the machine is provided a fixed cam 67, FIGS. 2, 10 and 12 for engagement by the leading roller 41 on the plate 40 fixed to the gripper bar 28 and a fixed inverted channel guide 68, FIGS. 8 and 12, for guiding engagement by the trailing roller 42 on the plate 40, the slot in the channel guide having a lead at its entry end.

At a point between the vertically movable plungers 52 is mounted a fixed arm 69 carrying an anvil 70 shown in the form of an anti-friction bearing for engagement by an adjustable stud 71 carried at the end of a forwardly extending lever 72 fixed on the gripper bar 28.

The operation of taking a sheet from the lay board to the deposition station is as follows:

The chains are set in motion to move the gripper bars 28 and one gripper bar is brought by the lower run of the chains upwards to the sheet-receiving position in which the grippers 31 register with the slots 27 in the edge of the lay board, the cross-shaft 55 being in the position about its axis such that the arms 56 thereon are held raised and the hook levers 57 are also held raised by the pins 60 on lever 61 as shown in dotted lines in FIG. 3.

As the gripper bar 28 approaches this position the leading roller 41 on the plate 40 fixed to the gripper bar makes engagement with the fixed cam 67 so that the gripper bar 28 and its grippers 31 are rocked in the blocks 33 in the gripper carriers 35 and against the end torsion springs 29 into a position in which the operative ends of the gripper fingers 45 and 46 are uptilted and extend into the slots in the edge of the lay board 23 (FIG. 7).

In taking this position the gripper bar depresses and slides over the vertically movable plungers 52 and any return movement of the gripper bar is prevented by engagement with the steeper side of the wedge-shaped top of the plunger 51 and the gripper bar rests upon the upper end of the plunger-guide 53.

In this position of the gripper bar 28 the trailing roller 42 on the plate 40 fixed to the gripper bar is engaged in the fixed channel guide 68 (FIG. 10), and the location of the gripper bar 28 fixed in the direction longitudinally of itself or in other words with reference to the width of the machine.

The cross-shaft 55 is now rocked by the cam-shaft 64, clockwise in FIG. 3, so that the hook-ended levers 57 are moved downwards by the springs 59 to engage the hooks with a fit on the rollers 43 and 44 (FIG. 4) on the ends of the gripper bars 28 so that the gripper bars are urged and held into the desired precise position longitudinally of the machine and with reference to the edge of the lay board 23, and relative to the chains 17 and 18.

Continued movement of the cross-shaft 55 results in engagement of the ends of the arms 56 on the cross-shaft engaging the rollers 50 on the tails of the upper fingers 46 of the pairs of gripper fingers 31 with the result that the gripper fingers are opened against the springs 48 as shown in FIG. 7, with the space between them immediately above the slots 27 in the lay board. The extent of the gripper-finger opening movement is determined by engagement of the stud 71 on the lever 72 fixed on the gripper bar 28 with the anvil 70 and bending or sagging of the gripper bar is prevented by the support provided by the upper ends of the plunger guides 53.

A sheet of paper, card or the like placed in position on the lay board 23, against the side fence 24 and with its forward edge against the stop fingers 25 at the delivery end of the lay board, lies with its leading edge between the open gripper fingers 45 and 46.

The cross-shaft 55 is now rocked by the cam-shaft 64 in the reverse direction i.e. counterclockwise in FIG. 3 so that first the arms 56 are disengaged from the rollers 50 and the upper gripper fingers 46 permitted to rock downwards to grip the edge of the sheet or card on the lay board and after an interval the hook-ended levers 57 are raised to disengage the hooks from the rollers 43, 44 on the ends of the gripper bar and at the same time the cross-shaft 26 is also rocked from the cam-shaft 64 to raise the stop-fingers 25 from in front of the leading edge of the sheet or card on the lay board 23. Thus the sheet or card to be fed is located with extreme accuracy relative to the gripper bar.

The chains are now set in motion to draw the above described gripper bar 28 through the space between the matrix 4 and the lowered platen 7 to a position somewhat beyond the surface of the platen so that the sheet or card rests upon the platen.

As the gripper bar moves away from the lay board 23 the leading roller 41 on the plate 40 fixed to the gripper bar moves from engagement with the cam 67 so that the gripper bar is permitted to rock clockwise in the blocks 33 under the urge of the torsion spring 39 so that a narrow strip at the leading edge of the sheet or card is bent at a downward inclination and the sheet or card thereby urged into good surface contact with the surface of the platen 7.

It is also necessary to locate the gripper bar and consequently the sheet with great accuracy with reference to the platen 7 and matrix 5 before the operation of depositing the liquid on the sheet or card is carried out.

Figure 13:
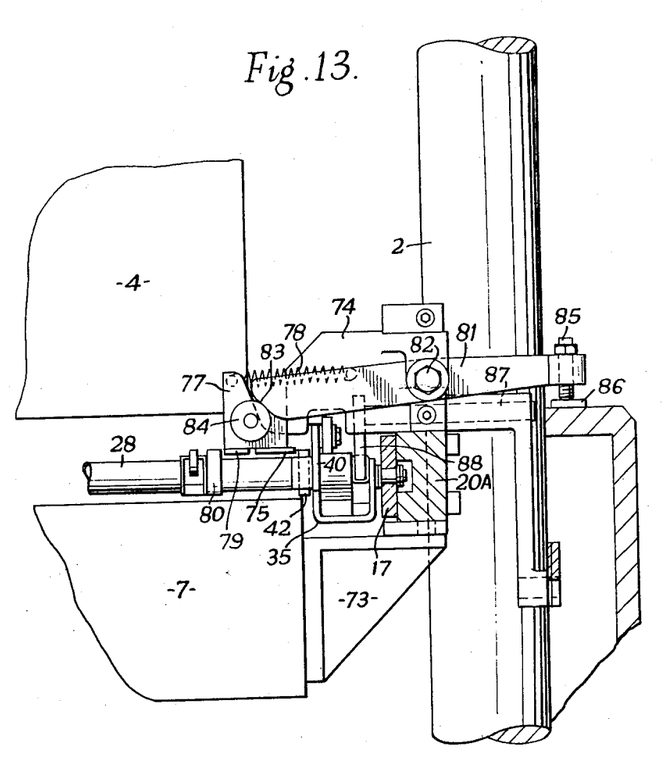
FIGS. 13 and 14 are views in end elevation showing the means for locating the gripper bars adjacent the matrix and platen in the lowered and raised positions of the platen respectively.
Figure 14:
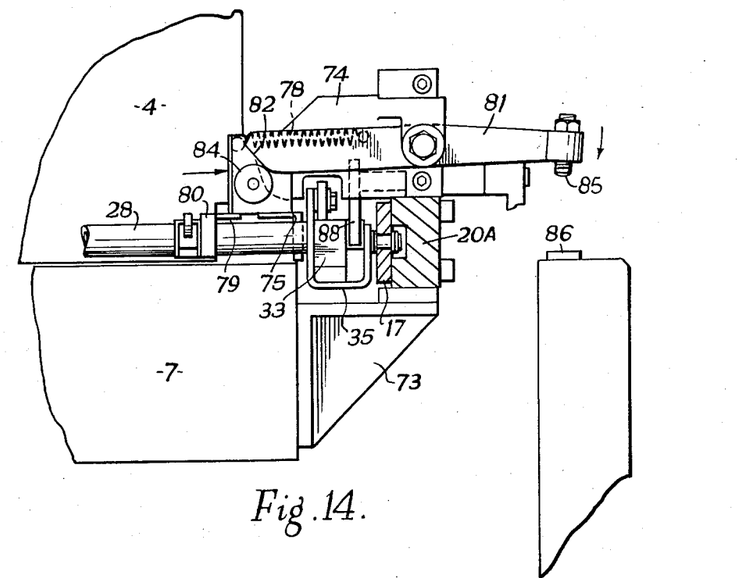

The means for achieving accurate location of the sheet between the matrix 4 and platen 7 is as follows:

As previously indicated, sections 20A of the chain guides 20 are affixed to the platen 7 for rising and falling movements therewith and FIGS. 13 and 14 illustrate the connection of the sections 20A to the platen by means of brackets 73.

Carried by an overhung upper part 74 of one of the brackets 73 and above the path of the gripper bar is mounted a horizontal plate having a locating edge 75 for engagement by a side face of the trailing roller 42 on the plate 40 fixed to the gripper bar 28, as the gripper bar emerges from and comes to rest at the outlet side of the platen 7.

On a vertical pivot 76 carried by the same overhung part 74 of the bracket 73 is mounted a lever 77 for limited rocking in a horizontal plane, said lever 77 being urged in one direction (counterclockwise in FIG. 15) by a tension spring 78.

Figure 15:
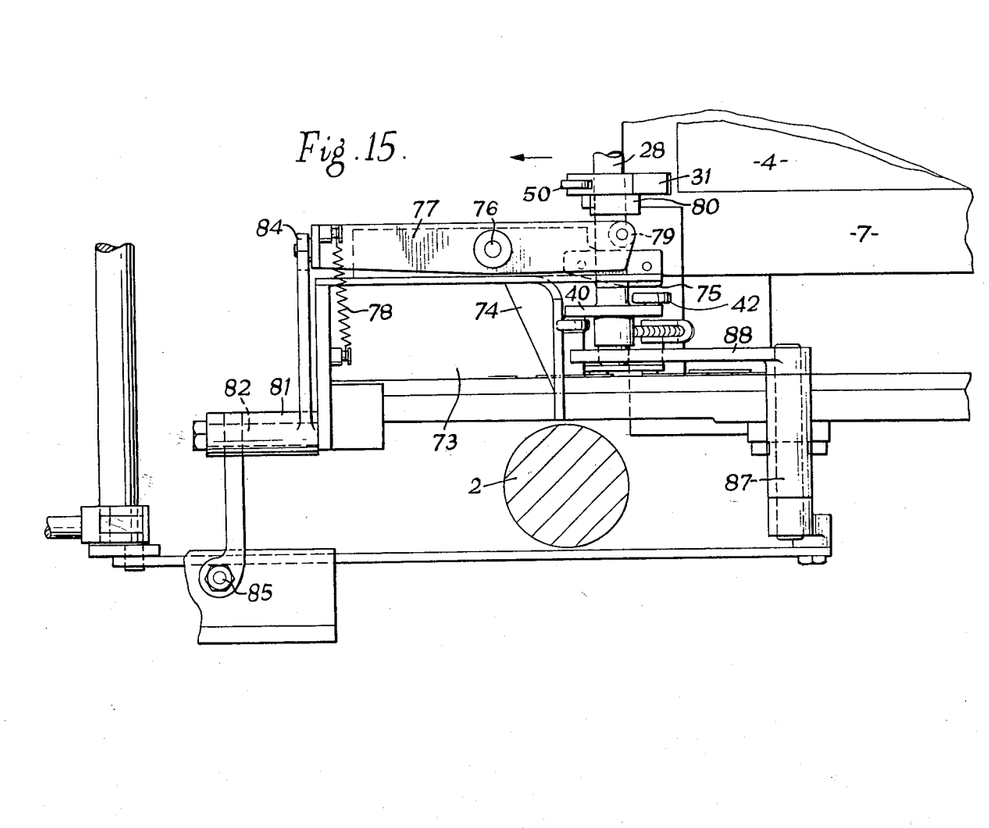
FIGS. 15 and 16 are views in plan corresponding to FIGS. 13 and 14 respectively.
Figure 16:
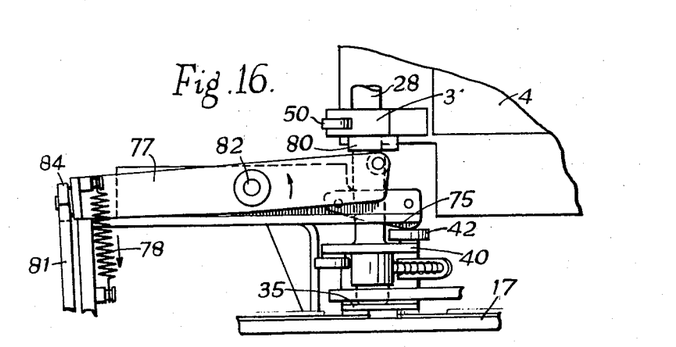

The lever 77 at one end is provided with a downwardly depending roller 79 for engagement with a collar 80 fixed on the gripper bar 28 at a point spaced from the plate 40 (FIGS. 4, 15 and 16). It will readily be seen that engagement of the roller 79 with the collar 80 under the pull of spring 78 will urge the gripper bar longitudinally of itself and ensure engagement of the trailing roller 42 on plate 40 with the fixed locating edge 75 to ensure accurate location of the gripper bar 28, the gripper fingers and the sheet or card held thereby between the platen and the matrix and transversely of the machine.

In order to ensure freedom of passage of the gripper bar over the platen into the above described rest position in the down positions of the platen it is necessary to remove the roller 79 from the path of the collar 80.

For this purpose a further lever 81 is mounted to rock in a vertical plane about a pivot 82 on the bracket 73, said lever 81 having an inclined surface 83 at one end for engagement with a roller 84 on the end of the lever 77, and at the other end an adjustable stop pin 85 arranged to make engagement with a fixed abutment surface 86 on the machine frame as the platen 7 moves into its lowered position as shown in FIG. 13 so that the inclined surface 83 on lever 81 engages and moves the roller 84 to rock the lever 77 about its vertical pivot against its spring 78 and withdraw the roller 79 from the path of the collar 80 on the gripper bar.

Figure 17:
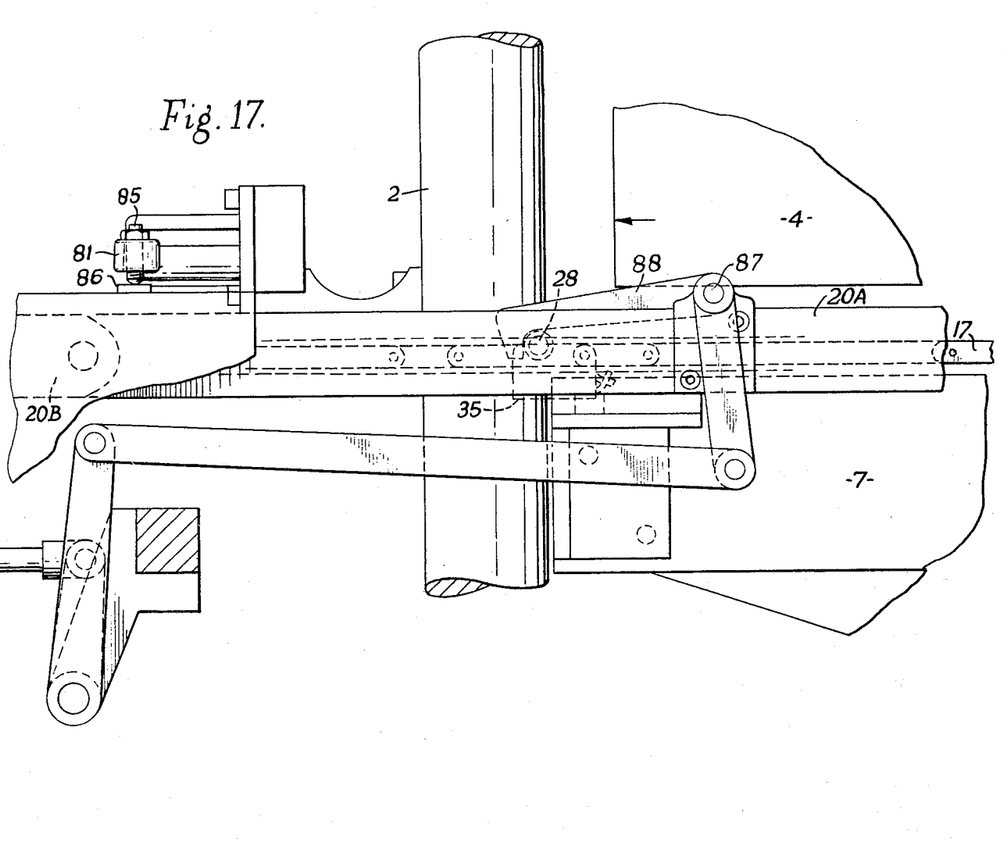
FIG. 17 is a side view of FIG. 15.

On horizontal pivot pins 87 on the parts 20A of the chain guides movable with the rising and falling platen 7 are mounted claw-ended levers 88 (FIGS. 13, 14, 15, 16) capable of rocking movement about the pivots 87 whilst the platen 7 is in its down position, the claws on the ends of the levers 88 in the down position, counterclockwise about the pivots 87, as shown in FIG. 17 lying in the path of the rollers 43, 44 on the gripper bar 28 drawing a sheet or card on to the platen 7 and the arrangement is such that the rollers 43, 44 meet the claws on the levers 88 just prior to the gripper bars 28 coming to rest, so that the pivoted blocks 33 on the gripper bar carriages 35 are rocked about their pivot pins 34 on the carriages 35 and the springs 36 on the plungers 37 loaded to maintain the rollers 43 and 44 against the claws on the levers 88 to locate the gripper bars 28 relative to the platen 7 in the direction longitudinally of the machine.

The claws of the levers 88 remain in retaining engagement with the rollers 43, 44, during th subsequent rising and falling movement of the platen 7 and the levers 88 are rocked first clockwise about their pivots 87 when the down position of the platen is reached to disengage the claws and release the gripper bar 28 for movement with a sheet away from above the platen and then counterclockwise to introduce the claw into the path of the rollers 43 and 44 of the next succeeding gripper bar 28.

The operation of accurately locating the sheet or card between the matrix 4 and platen 7 therefore is as follows.

With the platen 7 down and the claws on the claw-ended levers 85 in the lowered position, the chains move to draw the gripper bar 28 with the sheet or card held thereby over the surface of the platen until the gripper bar has just passed the platen and the rollers 43 and 44 on the gripper bar 28 have met the claws on levers 88, and movement of the chains is arranged to cease shortly after engagement of the rollers 43, 44 with the claws so that the blocks 33 on the gripper bar carriages 35 are rocked about their pivots 34 and the springs 36 loaded to hold the rollers 43 and 44 up to the claws on levers 88. At the same time the trailing roller 42 on plate 40 comes opposite the locating face 75, the lever 77 being meanwhile held, against the pull of its spring 78 and by the engagement of the inclined surface 83 on the lever 81 with the roller 84 on lever 77 in a position in which the roller 79 on lever 81 is out of the path of collar 80 on the gripper bar 28, it being understood that engagement of the inclined surface 83 with roller 84 is maintained whilst the stud 85 on lever 81 remains engaged with the fixed surface 86.

A further gripper bar 28 will have been brought simultaneously into position adjacent the lay board 23 in order to take up a new sheet or card in preparation for feeding, in the manner previously described.

Feed of the gripper bar 28 by the chains between the matrix 4 and platen 7 having ceased, the platen 7 commences to rise to move the card or sheet towards the matrix and the lever 77 is permitted to rock under the pull of its spring 78 as the fulcrum 82 of lever 81 rises and permits the lever 81 to rock. Thus the roller 79 on lever 77 is cause to engage the collar 80 fixed on the gripper bar 28 so that the gripper bar with the sheet held thereby is thrust longitudinally of itself to a position in which the roller 42 or the plate 40 on the gripper bar contacts the locator edge 75 whereby the sheet or card is accurately located transversely of the machine.

The sheet or card is thus accurately located and is clamped against the matrix by the platen 7 in preparation for the deposition of the patches of liquid in well known manner.

After deposition the platen 7 is lowered and the levers 81 and 77 caused to assume their previous positions against the pull of the spring 83 upon engagement of the stud 85 with the fixed surface 86 and the claw-ended levers 88 raised to disengage the claws from the rollers 43 and 44.

Movement of the chains is now resumed so that the card or sheet with deposit thereon is withdrawn from above the lowered platen and a further card or sheet fed from the lay board on to the platen and still another gripper bar loacted at the receiving position adjacent the lay board.

The card or sheet withdrawn from the platen 7 is moved by the chains and the gripper bar 28 to a take-off station outside and beyond the platen (FIGS. 1 and 18), the card or sheet being brought to rest whilst still gripped by the gripper fingers of the gripper bar.

At the take-off station there is provided a pair of parallel endless chains 89 stretched between sprockets 90 outside the main chains 17, 18.

Figure 18:
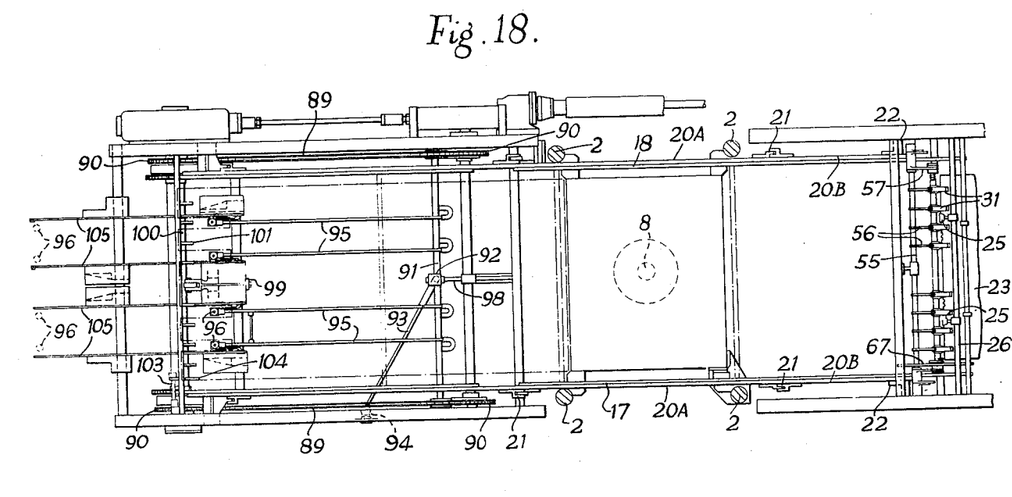
FIG. 18 is a plan view of the outlet or take-off end of the machine.

Between opposite links of the secondary chains 89 are connected a closed rigid air pipe 91 the interior of which is in communication through an on-off valve 92 and a flexible pipe 93 with a source of suction 94, FIG. 18.

A number of parallel longitudinal extending rigid air pipes 95 are fixedly connected with transverse air pipe 91, the pipes 95 at their other ends being in communication with upwardly directed suction cups 96 on carriages 97 arranged to slide in fixed longitudinal guides 98.

The secondary chains 89 are arranged to make a reciprocating movement of fixed amplitude in timed relation with movements of the main gripper feed chains, so that the assembly of air pipe 91, pipes 95, suction cups 96 and carriages 97 is moved longitudinally to and fro, and the valve 92 meeting abutments 98 and 99 at the end of the strokes to effect and interrupt suction at the cups 96.

Figure 19:
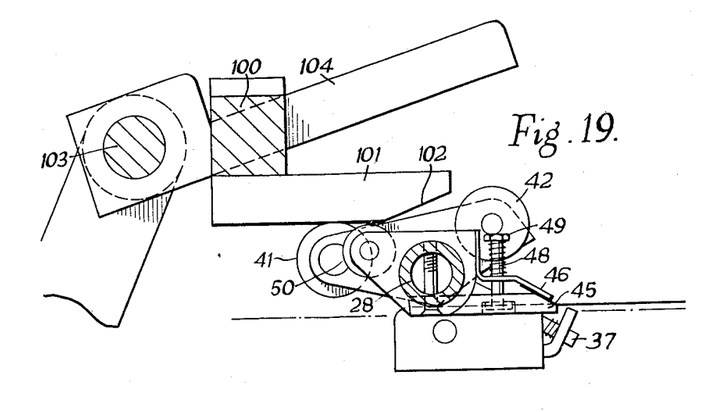
FIGS. 19, 20 and 21 show details of the take-off mechanism.

Across the machine near the outlet end of the take-off station (FIGS. 18, 19 and 20) is mounted a fixed cross bar 100 having a number of longitudinally extending fixed fingers 101 with cam ends 102 in position for engagement by the rollers 50 on the tails of the upper gripper finger 46 on the gripper bars 28 and in the above described rest position of the gripper bar which has withdrawn a card or sheet from the platen 7 the rollers 50 are engaged below the undersides of the fixed fingers 101 as shown in FIG. 19 in which position the pairs of gripper fingers 45, 46, have been rocked as a whole with the blocks 33 on the gripper bar carriages 35 to the extent permitted by engagement of the stops 38 on the blocks with the carriages 35, so that the bending of the leading edge of the card or sheet is relieved whilst the grip by the fingers 45, 46 is maintained.

Figure 20:
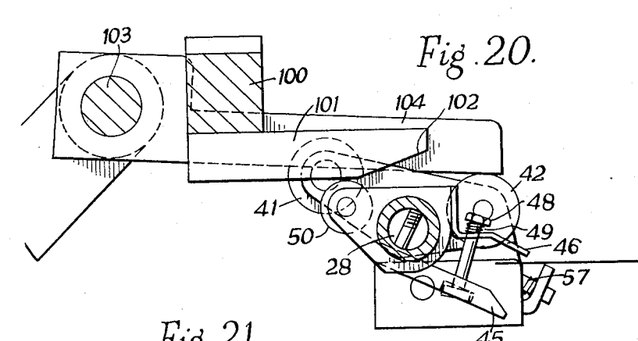
Figure 21:
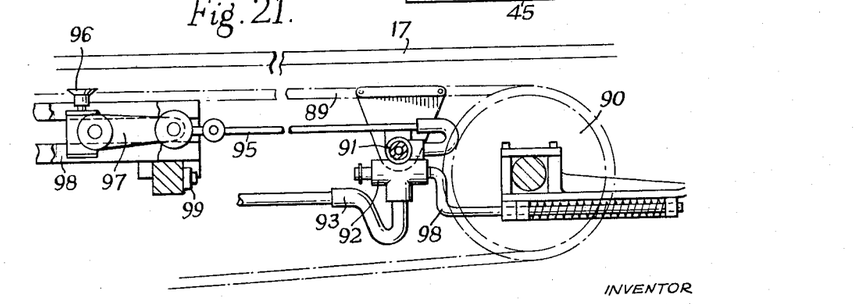

At the end of the machine and at the outer side of the bar 100 is mounted a shaft 103 on which is carried a rocking lever 104 capable of being rocked up and down between alternative positions as shown in FIGS. 19 and 20 and arranged in the lowered position to make pressure engagement with the trailing roller 42 on the plate 40 fixed on the gripper bar.

By such engagement the plate 40 and bar 28 are rocked against the reaction contact of the rollers 50 with the undersides of the fingers 101 so that the lower gripper fingers 45 of the gripper bar are rocked downwards to free the grip upon the leading edge of the sheet or card.

Beyond the end of the machine are provided fixedly mounted extensions 105 of the guides 98 for the carriages 97 of the suction cups 96, gaps being provided between the ends of the guides 98 and the extensions 105 of a width to pass the gripper bars 28 but such as can be bridged by the carriages 97.

In one extreme position of the suction cups 96 they are located at the inner side i.e. to the right hand side in FIG. 18, of the rest position of the gripper bar 28 and in the other extreme position they lie outside or beyond the end of the machine as shown in dotted lines in FIG. 18.

The operation of taking-off a sheet bearing deposit is as follows:

The movement of the reciprocating secondary chains 89 is timed to take place so that as the gripper bar 28 with the gripped sheet takes the rest position in which the rollers 50 on the tails of the upper gripper fingers 46 on the gripper bar engage beneath the fingers 101 the assembly of transverse air pipe 91, pipes 95, carriages 97 and suction cups 96 are caused by the secondary chains 89 to take the extreme position in which the suction cups 96 are located at the inner side of the gripper bar 28 and beneath the card or sheet as shown in full lines in FIG. 18 and the control member of the valve 92 has engaged the abutment 98 so that suction at the source 94 takes effect at the cups 96 so that the sheet or card adheres to the cups.

The lever 104 on the shaft 103 is rocked from the position shown in FIG. 19 downwards to the position shown in FIG. 20 to release the grip by the grippers 45, 46 on the leading end of the sheet or card.

During the next succeeding movements of the main chains 17, 18, the gripper bar 28 is moved away from the leading end of the sheet or card and passes downwards with the main chains around the end guide sprockets 19 supporting the main chains and through the gap between the ends of the guides of the carriages 97 for the suction cup 96 and the inner ends of the guide extensions 105.

Thus the gripper bar moves below the plane of the sheet or card and the secondary chains are then operated to move the above described assembly including suction cups 96 in the delivery direction i.e. to the left in FIG. 18 to remove the sheet or card bearing deposit from the machine and to a position whence they may be removed by hand or by mechanical means forming no part of the invention, the control member of the valve 92 in that position meeting the abutment 99 so that it is moved to cut off suction from the cups 96.

During this movement of the main chains a further sheet or card with deposit thereon is being withdrawn by another gripper from above the platen 7, a further sheet or card is being fed by another gripper bar towards the position on the platen 7 and a further gripper bar is being moved towards the receiving position adjacent the lay board 23.

I claim:

1. A feed mechanism for feeding paper and like sheets singly in intermittent succession from a source of sheets to a sheet processing or operating station, said mechanism comprising a lay table, a pair of parallel intermittently and synchronously moved conveyors, sets of sheet grippers, a plurality of substantially parallel and uniformly spaced gripper bars extending between said conveyors and each supporting a set of said sheet grippers, carriages fixed to said conveyors, gripper bar supports each in supporting and locating engagement with one end of a gripper bar and mounted in said carriages for limited pivotal movement therein about an axis at right angles to the pair of conveyors, first means in the region of the lay table for imparting movement about said axis to one pair of said gripper bar supports and a gripper bar supported thereby and relative to the general longitudinal direction of the conveyors to locate and thereafter temporarily maintain said gripper bar and the grippers carried thereby in a predetermined exact position in relation to the lay table with the conveyors stationary prior to the engagement of a sheet on the lay table by the sheet grippers on said gripper bar and the feed of the sheet by the conveyors to the operating station, further means in the region of the operating station imparting movement about said axis to another pair of said gripper bar supports and a further gripper bar supported thereby and relative to the general longitudinal direction of the conveyors to locate and thereafter maintain said further gripper bar and the grippers carried thereby in a predetermined exact position in relation to the operating station prior to the operation on the sheet at the station, first guide means in fixed position adjacent the lay board, second guide means in fixed position adjacent the operating station and contact members on the gripper bars engaging said guide means respectively and moving the gripper bars transversely to and between the two conveyors into exact predetermined transverse locations relative to the lay table and to the operating station respectively as the gripper bars take the said exact positions relative to the longitudinal direction of the conveyors and adjacent the lay table and the operating station respectively.

2. A machine for operating singly upon sheets and including feed mechanism as claimed in claim 1, wherein the said first guide means is a fixed cam surface and the contact members are rollers carried by arms mounted on the gripper bars in fixed position with reference to the longitudinal axes of the gripper bars, said rollers being rotatable in planes parallel to the planes containing the conveyors.

3. A sheet feeding mechanism as claimed in claim 1 comprising an apertured block pivotally mounted in each of the carriages for limited movement therein about an axis below and parallel to the axis of the respective gripper bar, one end of each of the gripper bars being mounted for guided sliding axial movement within an aperture in said apertured block.

4. A sheet feed mechanism as claimed in claim 1 including biasing means for urging the said gripper bar supports towards a limiting position in one direction about the pivots in the said carriages fixed to the conveyors and further biasing means for urging said gripper bars in one direction axially of the bars towards a limiting position relative to said carriages fixed to the conveyors.

5. A sheet feed mechanism as claimed in claim 1 having a pair of levers mounted for rocking movements in vertical planes, said levers having hook ends for engaging and embracing the gripper bars adjacent the ends thereof, to locate and retain a gripper bar in the predetermined exact position relative to the longitudinal direction of the conveyors when adjacent the lay board, when moved into engagement with the gripper bar.

6. In a machine for the production of colour cards and of the type having a machine frame structure, a matrix fixed in the frame structure, and a vertically movable platen for engaging a sheet with and disengaging a sheet from the said matrix, sheet feed mechanism comprising: a pair of laterally spaced endless intermittently and synchronously moving conveyor chains, guides for said chains including guide parts fixed on the frame structure and guide parts fixed to the platen for rising and falling movement therewith, a plurality of gripper bars extending between and connected with said chain conveyors for intermittent movement therewith and for slight locating movement relative thereto, sets of grippers mounted on said gripper bars, a lay table in fixed position on the machine frame structure, first means adjacent the lay table for imparting limited locating movement in the general longitudinal direction of the chains while said chains are stationary to a gripper bar extending between parts of the chains engaged in fixed chain-guide parts, further means fixed to the platen and adjacent the matrix imparting limited locating movement in the general longitudinal direction of the chains while said chains are stationary to a gripper bar extending between parts of the chains engaged in chain-guide parts, and means for imparting limited locating movement to a gripper bar adjacent the matrix in a direction transversely to and between the chains, said last named means comprising a fixed stop on the machine frame structure, a contact member fixed on the gripper bar with reference to the longitudinal axis of the gripper bar, a further stop member fixed on the gripper bar and a member movable in response to rising movement of the platen and engaging said further stop member for moving the gripper bar longitudinally of itself until said contact member contacts said fixed stop.

References Cited in the file of this patent

UNITED STATES PATENTS

| | | |
|---|---|---|
| 1,164,802 | Freeman | Dec. 21, 1915 |
| 2,025,481 | Stussi | Dec. 24, 1935 |
| 2,230,089 | Potdwin | Jan. 28, 1941 |
| 2,302,096 | Battey | Nov. 17, 1942 |
| 2,392,392 | Kaddeland | Jan. 8, 1946 |
| 2,848,226 | Buttner et al. | Aug. 19, 1958 |